(12) United States Patent
Choi (10) Patent No.: US 12,494,495 B2
(45) Date of Patent: Dec. 9, 2025

(54) BEAD-TYPE SEPARATOR FOR FUEL CELL AND ASSEMBLY THEREOF

(71) Applicants: Hyundai Motor Company, Seoul (KR); Kia Corporation, Seoul (KR)

(72) Inventor: Jae Hyeon Choi, Incheon (KR)

(73) Assignees: Hyundai Motor Company, Seoul (KR); Kia Corporation, Seoul (KR)

(*) Notice: Subject to any disclaimer, the term of this patent is extended or adjusted under 35 U.S.C. 154(b) by 592 days.

(21) Appl. No.: 17/874,125

(22) Filed: Jul. 26, 2022

(65) Prior Publication Data
US 2023/0216066 A1    Jul. 6, 2023

(30) Foreign Application Priority Data
Jan. 6, 2022  (KR) .......................... 10-2022-0002245

(51) Int. Cl.
| | |
|---|---|
| *H01M 8/0247* | (2016.01) |
| *H01M 8/0258* | (2016.01) |
| *H01M 8/0267* | (2016.01) |
| *H01M 8/0276* | (2016.01) |
| *H01M 8/2483* | (2016.01) |

(52) U.S. Cl.
CPC ....... *H01M 8/0247* (2013.01); *H01M 8/0258* (2013.01); *H01M 8/0267* (2013.01); *H01M 8/0276* (2013.01); *H01M 8/2483* (2016.02)

(58) Field of Classification Search
CPC ............. H01M 8/0247; H01M 8/2483; H01M 8/0258; H01M 8/0267; H01M 8/0276
See application file for complete search history.

(56) References Cited

U.S. PATENT DOCUMENTS

2022/0013793 A1*  1/2022 Ohmori ............... H01M 8/0206

FOREIGN PATENT DOCUMENTS

| | | |
|---|---|---|
| CN | 213401257 U | 6/2021 |
| JP | 4960415 B2 | 6/2012 |

* cited by examiner

*Primary Examiner* — Karie O'Neill Apicella
(74) *Attorney, Agent, or Firm* — Slater Matsil, LLP (57) ABSTRACT

A bead-type separator for a fuel cell includes a reaction surface disposed at a center of the separator and for reacting a flowing reaction gas, a diffusion part disposed at both sides of the reaction surface for diffusing the reaction gas, multiple manifold through-holes disposed in regions at both ends of the separator and introducing or discharging the reaction gas, and multiple protruding inner bead seals along a periphery of the regions in which the manifold through-holes are disposed, wherein the inner bead seals comprise a first inner bead seal disposed at the periphery of the region in which the manifold through-hole configured to discharge the reaction gas is formed, and wherein the first inner bead seal includes multiple main discharge bead flow fields protruding in tunnel shapes from a diffusion part and multiple main connection bead flow fields.

20 Claims, 4 Drawing Sheets

FIG. 1

-PRIOR ART-

FIG. 2

-PRIOR ART-

FIG. 3

-PRIOR ART-

BEAD-TYPE SEPARATOR FOR FUEL CELL AND ASSEMBLY THEREOF

CROSS-REFERENCE TO RELATED APPLICATIONS

This application claims the benefit of Korean Patent Application No. 10-2022-0002245, filed on Jan. 6, 2022, which application is hereby incorporated herein by reference.

TECHNICAL FIELD

The present disclosure relates to a bead-type separator for a fuel cell and an assembly thereof.

BACKGROUND

A fuel cell is a type of power generation device which converts chemical energy of fuel to electrical energy through an electrochemical reaction in a stack. The fuel cell may supply driving power to industries, homes, and vehicles, and may be used to supply power to compact electronic products such as portable devices. Recently, the field of use of the fuel cell has gradually expanded to using the fuel cell as a high-efficiency clean energy source.

In a typical fuel cell stack, a membrane-electrode assembly (MEA) is positioned at the innermost side. The membrane-electrode assembly includes a polymer electrolyte membrane capable of moving a hydrogen cation (proton) and catalytic layers applied on both surfaces of the electrolyte membrane such that hydrogen can react with oxygen, that is, a fuel electrode (an anode) and an air electrode (a cathode).

Furthermore, a gas diffusion layer (GDL) is stacked on the outside of the membrane-electrode assembly, that is, the outside at which the fuel electrode and the air electrode are positioned. Separators, which have a flow field for supplying fuel and discharging water generated by reaction, are positioned at the outside of the gas diffusion layer with a gasket interposed therebetween. An end plate for supporting and fixing the above-mentioned elements is coupled at the outermost side.

Therefore, at the fuel electrode of the fuel cell stack, a hydrogen oxidation reaction is performed, and thus hydrogen ions (protons) and electrons are generated. The generated hydrogen ions and electrons move to the air electrode through an electrolyte membrane and an electric wire, respectively. At the air electrode, water is generated through an electrochemical reaction in which the hydrogen ions and electrons moved from the fuel electrode, and oxygen in the air participate, and electrical energy is concurrently generated from the flow of electrons.

Each of the separators is an element for allowing hydrogen and air, which are reaction gases, and a coolant for cooling to be introduced into or discharged from each channel, and is normally manufactured to have a structure in which lands for playing the supporting role and channels (flow fields) which are paths for the flow of a fluid are repeatedly formed.

That is, a typical separator has a structure in which lands and channels (flow fields) are repeatedly bent, and thus a channel formed on one surface facing the gas diffusion layer is used as a space in which a reaction gas, such as hydrogen or air, flows, and a channel formed at the opposite side is used as a space in which a coolant flows. Therefore, one unit cell may be formed using two separators, such as one separator having a hydrogen/coolant channel and one separator having an air/coolant channel.

In each separator, multiple manifold through-holes, which are passages for introducing or discharging a reaction gas or a coolant, are formed, and a reaction surface having a flow field through which a reaction gas or a coolant flows is formed between entrance-side manifold through-holes and exit-side manifold through-holes. The flow field is formed by a structure in which the above-mentioned lands and channels are repeated.

Furthermore, diffusion parts may be formed between the reaction surface and the entrance-side manifold through-holes and between the reaction surface and the exit-side manifold through-holes, respectively, such that a reaction gas or a coolant can be diffused.

The manifold through-holes, the reaction surface, and the diffusion parts are spaces through which a reaction gas or a coolant is introduced or discharged or flows, and for airtightness, an airtight line is formed by a gasket along the periphery thereof.

Typically, the airtight line is formed by spraying, in a predetermined thickness, a gasket made of a rubber material onto the surface of the separator.

However, when an airtight line is formed by the typical airtight line forming method, the number of gaskets used may be increased, and there may be a difference in the quality of an airtight line for each region depending on the quality of gaskets.

Therefore, in order to solve the problems of the typical airtight line, studies on other methods for forming an airtight line have been performed.

In a representative example, a bead-type airtight line is formed.

Figure 1:
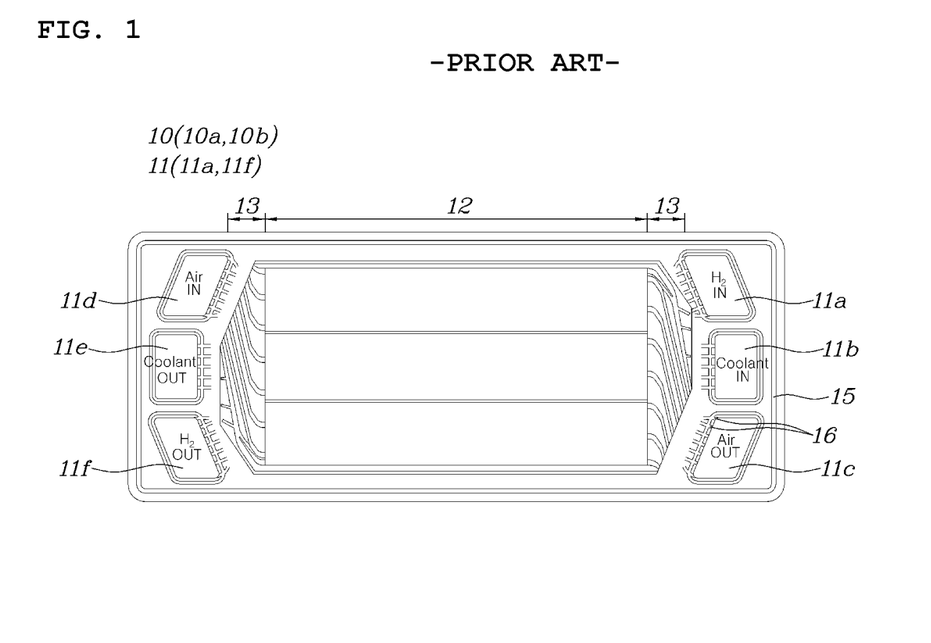
FIG. 1 is a plan view showing a conventional bead-type separator assembly for a fuel cell.
Figure 2:
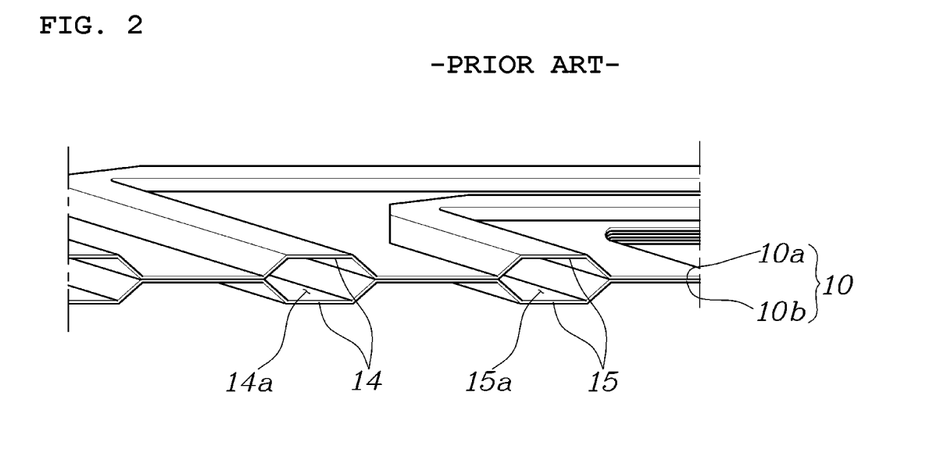
FIG. 2 is a partial cross-sectional view showing a conventional bead-type separator assembly for a fuel cell.

FIG. 1 is a plan view showing a conventional bead-type separator assembly for a fuel cell, and FIG. 2 is a partial cross-sectional view showing a conventional bead-type separator assembly for a fuel cell.

As illustrated in FIG. 1, in a conventional bead-type separator assembly 10 for a fuel cell, a pair of separators 10a and 10b manufactured in plate shapes are brought into contact with and bonded to each other. Each of the separators 10a and 10b, like a typical separator, has multiple manifold through-holes 11 functioning as passages through which a reaction gas or a coolant is introduced or discharged. Furthermore, a reaction surface 12, having a flow field along which a reaction gas or a coolant flows, is formed between manifold through-holes 11a, 11b, and 11c disposed at one side and manifold through-holes 11d, 11e, and 11f disposed at the other side. Furthermore, diffusion parts 13 are formed between the reaction surface 12 and the manifold through-holes 11a, 11b, and 11c disposed at one side and between the reaction surface 12 and the manifold through-holes 11d, 11e, and 11f disposed at the other side, respectively, such that a reaction gas or a coolant can be diffused.

Furthermore, in each of the separators 10a and 10b, an outer bead seal 14 protruding for sealing is formed along the outer edge thereof, and multiple inner bead seals 15 protruding for sealing are formed along the periphery of each region in which the multiple manifold through-holes 11a to 11f are formed.

At this time, a gasket (not shown), which is a rubber sealing material, may be applied on the surfaces of the outer bead seal 14 and the inner bead seals 15, thereby achieving an airtight effect by the outer bead seal 14 and the inner bead seals 15.

The multiple manifold through-holes 11a to 11f are formed through the plate-shape separators 10a and 10b. A land and a channel forming a flow field, the outer bead seal 14, and the inner bead seals 15 are formed by forming ridges and grooves in each of the separators 10a and 10b. Therefore, in a press process performed to form the land and the channel, both the outer bead seal 14 and the inner bead seals 15 may be formed, and thus a separate process may not be required to be additionally performed.

Furthermore, as illustrated in FIG. 2, by bonding the pair of separators 10a and 10b to each other, an outer airtight line 14a is formed by the outer bead seals 14 formed at the respective separators 10a and 10b, and multiple inner airtight lines 15a are formed by the multiple inner bead seals 15.

Figure 3:
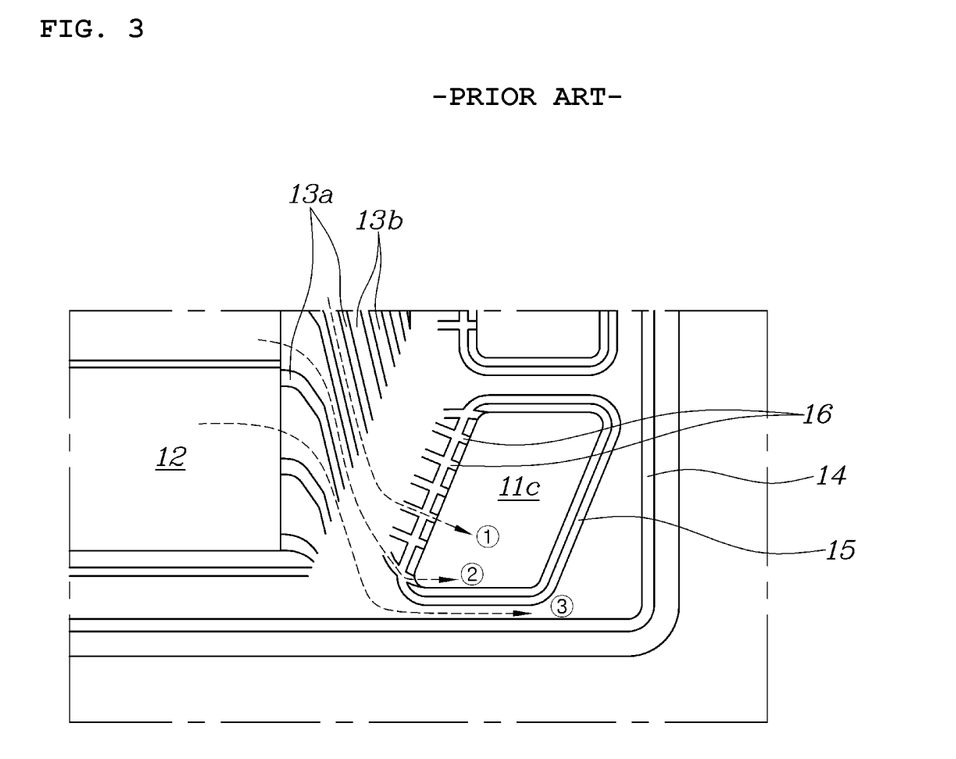
FIG. 3 shows a path along which a reaction gas is discharged in a conventional bead-type separator assembly for a fuel cell.

FIG. 3 shows a path along which a reaction gas is discharged in a conventional bead-type separator assembly for a fuel cell.

As illustrated in FIG. 3, a reaction gas, which has not reacted on the reaction surface 12, may flow along diffusion flow fields 13b formed by flow field guides 13a in the diffusion part 13, may pass through reaction gas discharge flow fields 16 formed on boundary surfaces of the pair of separators 10a and 10b constituting the separator assembly, and then may be discharged out of a fuel cell stack through a manifold through-hole 11c for reaction gas discharging (path ① in FIG. 3). At this time, generated water generated by reaction of a reaction gas in the reaction surface 12 may be discharged out of the fuel cell stack along the same passage as the unreacted reaction gas.

However, as described above, when the unreacted reaction gas and the generated water are discharged along a normal path, there is no problem, but the closed loop structure of the outer airtight line 14a and the inner airtight lines 15a formed in the conventional bead-type separator assembly for a fuel cell causes a problem that the unreacted reaction gas and the generated water remain and stagnate around the manifold through-hole 11c for reaction gas discharging.

For example, as illustrated in FIG. 3, even when unreacted reaction gas and generated water flowing from the reaction surface 12 to the manifold through-hole 11c for reaction gas discharging are introduced into the reaction gas discharge flow fields 16, a part of the unreacted reaction gas and a part of the generated water may not be discharged to the manifold through-hole 11c for reaction gas discharging, and may remain and stagnate in the reaction gas discharge flow fields 16 and in the inner bead seal 15 by the effect of the gravity (path ② in FIG. 3)

Furthermore, as illustrated in FIG. 3, the unreacted reaction gas and the generated water, which flow from the reaction surface 12 to the manifold through-hole 11c for reaction gas discharging, may be partially introduced into and stagnate in a space between the outer bead seal 14 and the inner bead seal 15 without being introduced into the reaction gas discharge flow fields 16 (path ③ in FIG. 3).

The generated water, which abnormally stagnates like this, is difficult to discharge due to the structural characteristics of the bead-type separator assembly, and thus may remain to cause corrosion.

Furthermore, in winter, the stagnant generated water may freeze, and thus poor airtightness may be caused, whereby durability may be reduced.

The above descriptions regarding background technologies have been made only to help understanding of the background of the present disclosure, and are not to be deemed by those skilled in the art to correspond to already known prior art.

SUMMARY

The present disclosure relates to a bead-type separator for a fuel cell and an assembly thereof. Particular embodiments relate to a bead-type separator for a fuel cell and an assembly thereof, wherein generated water may be prevented from remaining and stagnating around a manifold through-hole for reaction gas discharging due to structural characteristics.

Embodiments of the present disclosure provide a bead-type separator for a fuel cell and an assembly thereof, wherein, due to the structural characteristics of the bead-type separator assembly, generated water may be prevented from remaining and stagnating around a manifold through-hole for reaction gas discharging.

Technical problems to be solved by embodiments of the present disclosure are not limited to the above-mentioned technical aspect, and other technical aspects, which are not mentioned, will be clearly understood by those skilled in the art from the description of the present disclosure.

In accordance with an embodiment of the present disclosure, a bead-type separator for a fuel cell may be formed in a plate shape and may include a reaction surface which is formed at the center of the separator and on which a reaction gas reacts while flowing, a diffusion part formed at each of both sides of the reaction surface and in which a reaction gas is diffused, multiple manifold through-holes which are formed at both ends of the separator and through which a reaction gas is introduced or discharged, and multiple inner bead seals which protrude for sealing and are formed along the periphery of each region in which the manifold through-holes are formed, wherein an inner bead seal, among the multiple inner bead seals, which is formed at the periphery of a region where a manifold through-hole for reaction gas discharging, through which at least a reaction gas is discharged, is formed, may include multiple main discharge bead flow fields, which protrude in tunnel shapes from the diffusion part so as to connect the manifold through-hole for reaction gas discharging and are formed along the periphery of the manifold through-hole for reaction gas discharging while being spaced apart from each other, and multiple main connection bead flow fields, each of which is formed to make neighboring main discharge bead flow fields communicate with each other.

An entrance of each of the main discharge bead flow fields may be connected to the diffusion part, an exit thereof may be connected to the manifold through-hole for reaction gas discharging, and each of the main discharge bead flow fields may be formed to slope downward from the entrance toward the exit thereof with reference to a gravity direction.

An entrance of a main discharge bead flow field, formed in a lowest position in the gravity direction, among the multiple main discharge bead flow fields may be formed in a lower position than an exit of a diffusion flow field, formed in a lowest position in the gravity direction, among multiple diffusion flow fields which are formed at the diffusion part and through which a reaction gas flows.

The inner bead seal, among the multiple inner bead seals, which is formed at the periphery of a region where a manifold through-hole for reaction gas discharging, through which at least a reaction gas is discharged, is formed, may further include an edge bead formed along the periphery of the manifold through-hole for reaction gas discharging in the remaining region other than a region in which the multiple main discharge bead flow fields and the multiple main connection bead flow fields are formed.

The inner bead seal may form a closed loop surrounding the periphery of the manifold through-hole for reaction gas discharging by the multiple main discharge bead flow fields, the multiple main connection bead flow fields, and the edge bead.

The edge bead may include a sub connection bead flow field connected to a main discharge bead flow field, formed in the lowest position in the gravity direction, among the multiple main discharge bead flow fields, and a sub discharge bead flow field connected to the manifold through-hole for reaction gas discharging.

A position in which the sub connection bead flow field is connected to the main connection bead flow field, formed in the lowest position in the gravity direction, among the multiple main connection bead flow fields may be formed closer to the entrance than a position in which a main connection bead flow field is connected.

The multiple main connection bead flow fields may be disposed in a straight line along the periphery of the region in which the manifold through-hole for reaction gas discharging is formed.

At least one selected main connection bead flow field among the multiple main connection bead flow fields may be formed closer to the entrance of the main discharge bead flow field than an unselected main connection bead flow field.

The selected main connection bead flow field and the unselected main connection bead flow field, among the multiple main connection bead flow fields, may be alternately disposed.

The widths of the main discharge bead flow fields may be formed to be larger than the widths of the main connection bead flow fields.

An outer bead seal protruding for sealing may be further formed along an outer edge of the separator so as to surround the reaction surface, the diffusion part, and the multiple inner bead seals.

A bead-type separator assembly for a fuel cell, according to an embodiment of the present disclosure, may be a bead-type separator assembly for a fuel cell, in which a pair of separators formed in a bead type are bonded to each other, and may include a first separator that is formed in a plate shape and includes a first reaction surface which is formed at the center of the first separator and on which a reaction gas reacts while flowing, a first diffusion part which is formed at each of both sides of the first reaction surface and in which a reaction gas is diffused, multiple first manifold through-holes which are formed at both ends of the first separator and through which a reaction gas is introduced or discharged, multiple first inner bead seals which protrude for sealing and are formed along the periphery of each region in which the first manifold through-holes are formed, wherein a first inner bead seal, among the multiple first inner bead seals, which is formed at the periphery of a region where a first manifold through-hole for reaction gas discharging, through which at least a reaction gas is discharged, is formed, may include multiple first main discharge bead flow fields, which protrude in tunnel shapes from the first diffusion part so as to connect the first manifold through-hole for reaction gas discharging and are formed along the periphery of the first manifold through-hole for reaction gas discharging while being spaced apart from each other, and multiple first main connection bead flow fields, each of which is formed to make neighboring first main discharge bead flow fields communicate with each other, and a second separator that is formed in a plate shape, is bonded to and integrated with the first separator, and includes second main discharge bead flow fields, formed in positions corresponding to positions in which the first main discharge bead flow fields are formed and protruding in a direction opposite to a direction in which the main discharge bead flow fields protrude, and second main connection bead flow fields, formed in positions corresponding to positions in which the first main connection bead flow fields are formed and protruding in a direction opposite to a direction in which the first main connection bead flow fields protrude, wherein the first separator and the second separator are bonded to each other to form multiple main discharge flow field lines including the multiple first main discharge bead flow fields and the multiple second main discharge bead flow fields, and to form multiple main connection flow field lines including the multiple first main connection bead flow fields and the multiple second main connection bead flow fields.

The second separator may include a second reaction surface which is formed at the center of the second separator and on which a reaction gas reacts while flowing, a second diffusion part which is formed at each of both sides of the second reaction surface and in which a reaction gas is diffused, multiple second manifold through-holes which are formed at both ends of the second separator and through which a reaction gas is introduced or discharged, and multiple second inner bead seals which protrude for sealing and are formed along the periphery of each region in which the second manifold through-holes are formed, wherein a second inner bead seal, among the multiple second inner bead seals, which is formed at the periphery of a region where a second manifold through-hole for reaction gas discharging, through which at least a reaction gas is discharged, is formed, may include the multiple second main discharge bead flow fields and the multiple second main connection bead flow fields.

In the first separator, the inner bead seal, formed at the periphery of a region in which the first manifold through-hole for reaction gas discharging is formed, may further include a first edge bead formed along the periphery of the first manifold through-hole for reaction gas discharging in the remaining region other than a region in which the multiple first main discharge bead flow fields and the multiple first main connection bead flow fields are formed. The second separator may further include a second edge bead formed in a position corresponding to a position in which the first edge bead is formed and protruding in a direction opposite to a direction in which the first edge bead protrudes. The first separator and the second separator may be bonded to each other to form an inner airtight line including the first inner bead seals and the second inner bead seals, and the inner airtight line may form a closed loop.

An entrance of the main discharge flow field line may be connected to a region in which the first diffusion part faces the second diffusion part, an exit thereof may be connected to a region in which the first manifold through-hole for reaction gas discharging communicates with the second manifold through-hole for reaction gas discharging, and the main discharge flow field line may be formed to slope downward from the entrance toward the exit thereof with reference to a gravity direction.

The first separator may further include a first outer bead seal protruding for sealing and formed along the outer edge of the first separator so as to surround the first reaction surface, the first diffusion part, and the multiple first inner bead seals. The second separator may include a second outer bead seal formed in a position corresponding to a position in which the first outer bead seal is formed and protruding in a direction opposite to a direction in which the first outer bead seal protrudes. The first separator and the second separator may be bonded to each other to form an outer airtight line including the first outer bead seal and the second outer bead seal, and the outer airtight line may form a closed loop.

A sealing material may be applied on the surface of each of the outer airtight line and the inner airtight line.

According to an embodiment of the present disclosure, generated water may be prevented from remaining and stagnating around the manifold through-hole for reaction gas discharging by improving a structure in which a path for discharging a reaction gas is formed between a diffusion part and a manifold through-hole for reaction gas discharging.

Therefore, the generated water may be prevented from undesirably stagnating, and thus a separator may be prevented from being corroded by the generated water, whereby the durability of a fuel cell stack may be improved.

Furthermore, in winter, the generated water may be prevented from freezing in an undesired position, and the separator may be prevented from being damaged or deformed by freezing of the generated water, whereby the durability of the fuel cell stack may be improved.

BRIEF DESCRIPTION OF THE DRAWINGS

The above and other aspects, features and advantages of embodiments of the present disclosure will be more apparent from the following detailed description taken in conjunction with the accompanying drawings, in which.

DETAILED DESCRIPTION OF ILLUSTRATIVE EMBODIMENTS

Hereinafter, embodiments of the present disclosure will be described in detail with reference to the accompanying drawings. However, the present disclosure is not limited to the embodiments disclosed below, and may be implemented in various different forms. The present embodiments are provided to make the present disclosure complete and fully inform those skilled in the art of the category of the disclosure. Identical numerals in the drawings may denote identical elements.

Figure 4:
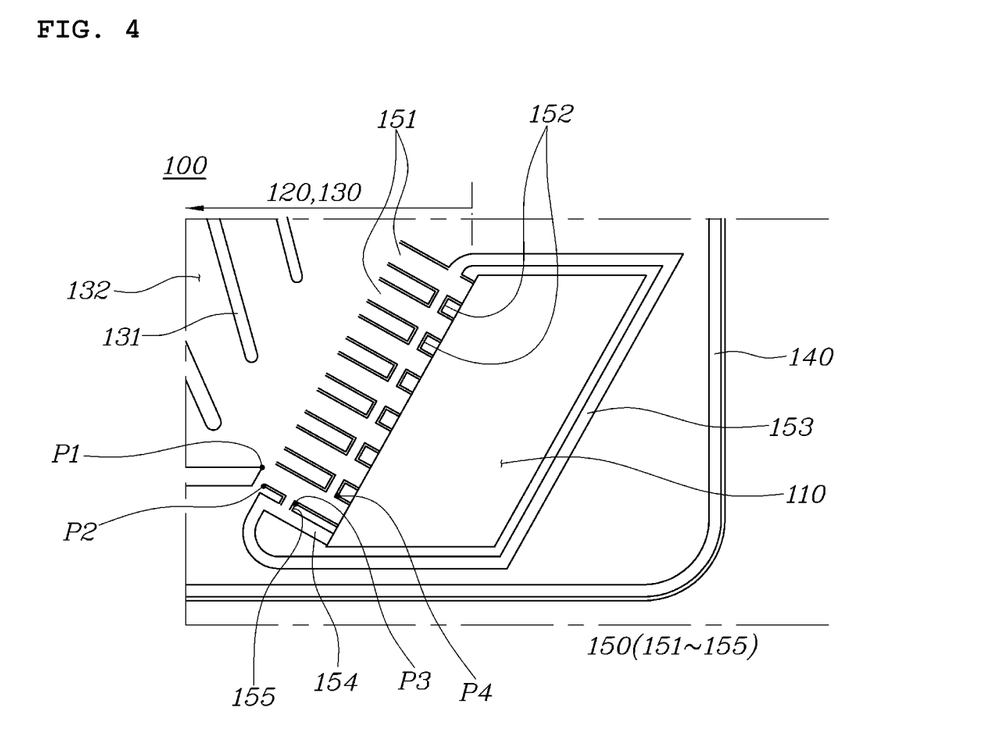
FIG. 4 is a plan view showing a recessed part of a first separator constituting a bead-type separator assembly for a fuel cell according to an embodiment of the present disclosure.
Figure 5:
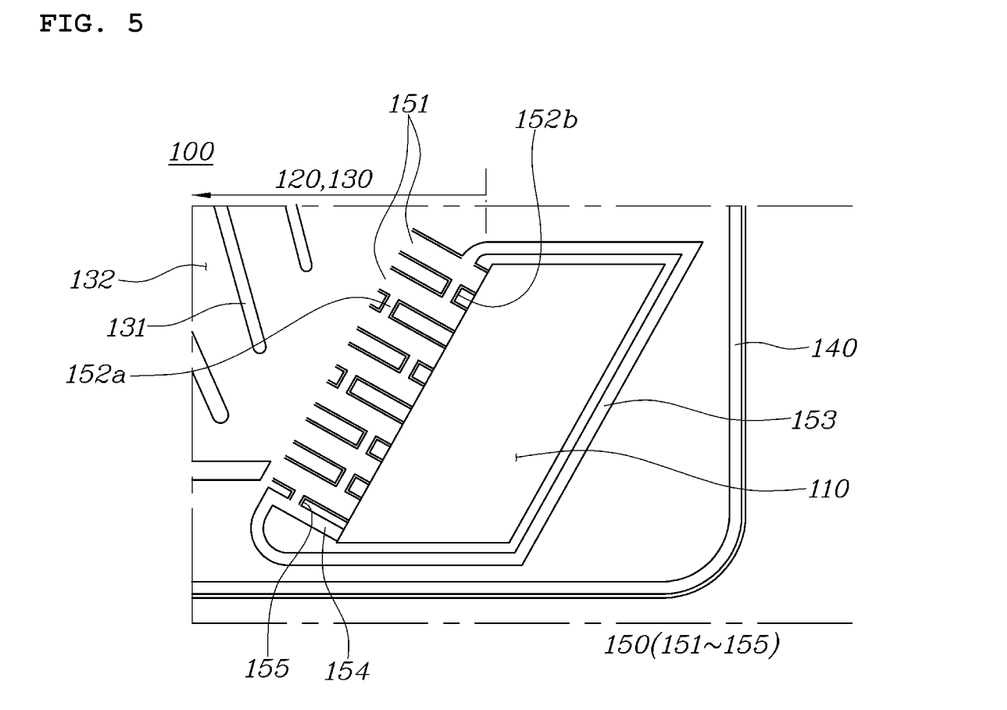
FIG. 5 is a plan view showing a recessed part of a first separator constituting a bead-type separator assembly for a fuel cell according to another embodiment of the present disclosure.

FIG. 4 is a plan view showing a recessed part of a first separator constituting a bead-type separator assembly for a fuel cell according to an embodiment of the present disclosure. FIG. 5 is a plan view showing a recessed part of a first separator constituting a bead-type separator assembly for a fuel cell according to another embodiment of the present disclosure.

In the disclosed embodiments of the present disclosure, there is a description made based on the gravity direction. The upward direction in FIG. 4 is an upper side with reference to the gravity direction, and the downward direction in FIG. 4 is a lower side with reference to the gravity direction. Hereinafter, if there are no other limitations, the upward direction and the downward direction should be construed based on the gravity direction.

A bead-type separator assembly for a fuel cell, according to an embodiment of the present disclosure, may be formed to have a structure that is overall similar to that of the conventional bead-type separator assembly 10.

For example, in the bead-type separator assembly for a fuel cell according to an embodiment of the present disclosure, a pair of separators manufactured in a plate shape may be integrated by being brought into contact with and attached to each other. The pair of separators may be called a first separator 100 and a second separator, respectively. Therefore, the first separator 100 may be used as a cathode-side separator, and the second separator may be used as an anode-side separator.

The first separator 100 and the second separator may be formed to be symmetric to each other with reference to surfaces facing each other, and thus the shapes and elements thereof will be described with reference to the first separator 100, and a redundant description for the second separator will be omitted.

The first separator 100 may be formed to have a structure similar to that of a first separator 10a constituting the conventional bead-type separator assembly 10.

For example, the first separator 100 may be formed in a plate shape, and multiple first manifold through-holes 110, through which a reaction gas or a coolant is introduced or discharged, are formed at both sides of the first separator 100. The multiple first manifold through-holes 110 are classified into a first manifold through-hole for reaction gas introduction, through which a reaction gas is introduced, a first manifold through-hole for coolant introduction, through which a coolant is introduced, a first manifold through-hole for reaction gas discharging, through which a reaction gas is discharged, and a first manifold through-hole for coolant discharging, through which a coolant is discharged.

Therefore, similar to the illustration in FIG. 1, one first manifold through-hole, through which hydrogen as a reaction gas is introduced, and two first manifold through-holes, through which a coolant and air as a reaction gas are discharged, respectively, may be formed at one side of the first separator 100. Furthermore, one first manifold through-hole, through which hydrogen as a reaction gas is discharged, and two first manifold through-holes, through which a coolant and air as a reaction gas are introduced, respectively, may be formed at the other side of the first separator 100. Thus, hydrogen and air may flow in the opposite directions, and a coolant may flow in the same direction as air. The presented functions and positions of the first manifold through-holes no may be variously changed depending on the shape of a separator and a product specification.

Furthermore, the first separator 100 may have a first reaction surface 120 which is formed between the first manifold through-holes no formed at one side thereof and the first manifold through-holes 110 formed at the other side thereof and which has a flow field along which a reaction gas or a coolant flows. First diffusion parts 130 may be formed between the first reaction surface 120 and the first manifold through-holes 110 formed at one side and between the first reaction surface 120 and the first manifold through-holes 110 formed at the other side, respectively, such that a reaction gas or a coolant may be diffused.

The first separator 100 may have multiple first inner bead seals 150 protruding for sealing and formed along the periphery of respective regions in which the multiple first manifold through-holes no are formed. Furthermore, a first outer bead seal 140 protruding for sealing may be formed along the outer edge of the first separator 100 so as to surround all of the first reaction surface 120, the first diffusion part 130, and the multiple first inner bead seals 150.

At this time, among the multiple first inner bead seals 150, a first inner bead seal 150, formed on the periphery of a region where the first manifold through-hole 110 for reaction gas discharging through which at least a reaction gas is discharged is formed, may have a structure capable of smoothly discharging generated water to the first manifold through-hole 110 for reaction gas discharging.

For example, a first inner bead seal 150 formed at the periphery of a first manifold through-hole 110 for reaction gas discharging may include multiple first main discharge bead flow fields 151 protruding in tunnel shapes from the first diffusion part 130 so as to connect the first manifold through-holes no for reaction gas discharging, and formed along the periphery of the first manifold through-hole 110 for reaction gas discharging while being spaced apart from each other, multiple first main connection bead flow fields 152 formed to make first main discharge bead flow fields 151 adjacent to each other communicate with each other, and a first edge bead 153 formed along the periphery of the first manifold through-hole 110 for reaction gas discharging in the remaining region other than a region in which the multiple first main discharge bead flow fields 151 and the multiple first main connection bead flow fields 152 are formed.

Each of the first main discharge bead flow fields 151 may be regions forming flow fields along which a reaction gas is discharged, may be formed in a tunnel shape, may have an entrance connected to the first diffusion part 130, and may have an exit connected to the first manifold through-holes no for reaction gas discharging.

At this time, each of the first main discharge bead flow fields 151 may be formed to slope downward, with reference to the gravity direction, from the entrance toward the exit thereof. Therefore, while an unreacted reaction gas and generated water, which flow in the first diffusion part 130, are introduced through the entrances of the first main discharge bead flow fields 151 and then discharged through the exits thereof, the generated water may be discharged by the flow amount and the flow rate of the unreacted reaction gas, and the generated water may also be discharged without remaining in the first main discharge bead flow fields 151 by the gravity.

Furthermore, each of the first main discharge bead flow fields 151 may be formed in a straight line shape for smooth discharging of a reaction gas and generated water, and the multiple first main discharge bead flow fields 151 may be formed parallel to each other while being spaced a predetermined interval apart from each other.

Particularly, in order to allow all of a reaction gas and generated water having flowed to the first diffusion part 130 to be introduced into the first main discharge bead flow fields 151, the entrance of a first main discharge bead flow field 151, formed in a lowest position in the gravity direction, among the multiple first main discharge bead flow fields 151 may be formed in a lower position than the exit of a first diffusion flow field 132, formed in the lowest position in the gravity direction, among multiple first diffusion flow fields 132 which are formed in the first diffusion part 130 and along which the reaction gas flows.

Specifically, in FIG. 4, an entrance-side lowest position P2 of the first main discharge bead flow field 151, formed in the lowest position in the gravity direction, among the multiple first main discharge bead flow fields 151 may be lower in the gravity direction than an exit-side lowest position P1 of the first diffusion flow field 132, formed in the lowest position in the gravity direction, among the multiple first diffusion flow fields 132 which are formed in the first diffusion part 130 and along which the reaction gas flows.

Therefore, the reaction gas and the generated water having flowed to the first diffusion flow field 132 formed in the lowest position in the first diffusion part 130 may also be fully introduced into the first main discharge bead flow field 151 formed in the lowest position in the gravity direction among the multiple first main discharge bead flow fields 151.

Each of the first main connection bead flow fields 152 may connect neighboring first main discharge bead flow fields 151 to each other, such that each of the first inner bead seals may play the role of forming a closed loop and simultaneously allowing a reaction gas and generated water to flow into the neighboring first main discharge bead flow fields 151.

Furthermore, the first edge bead 153 may have a first sub connection bead flow field 155, connected to the first main discharge bead flow field 151 formed in the lowest position in the gravity direction, among the multiple first main discharge bead flow fields 151, and a first sub discharge bead flow field 154 connected to the first manifold through-hole 110 for reaction gas discharging.

Therefore, the first inner bead seal 150 may form a closed loop surrounding the periphery of the first manifold through-hole 110 for reaction gas discharging by the multiple first main discharge bead flow fields 151, the multiple first main connection bead flow fields 152, and the first edge bead 153.

As illustrated in FIG. 4, in the first main connection bead flow fields 152 formed in the lowest position in the gravity direction among the multiple first main connection bead flow fields 152, a position P3 in which the first sub connection bead flow field 155 is connected may be formed closer to an entrance than a position P4 in which the first main connection bead flow field 152 is connected.

Therefore, although generated water flows from a first main discharge bead flow field 151, formed in a relatively high position, into a first main discharge bead flow field 151 formed thereunder through the first main connection bead flow fields 152, the generated water having flowed into a first main discharge bead flow field 151 formed in the lowest position through the first main connection bead flow fields 152 may be discharged out of a fuel cell stack through the first manifold through-hole 110 for reaction gas discharging via the exit of the first main discharge bead flow field 151 without flowing to the first sub connection bead flow field 155 due to the weight of the generated water.

Furthermore, the generated water introduced through the entrance of the first main discharge bead flow field 151 formed in the lowest position in the first diffusion part 130 may be directly discharged to the first manifold through-hole 110 for reaction gas discharging through the exit of the first main discharge bead flow field 151, or may be introduced into the first sub connection bead flow field 155 and then discharged to the first manifold through-hole 110 for reaction gas discharging through the first sub discharge bead flow field 154.

As illustrated in FIG. 4, the multiple first main connection bead flow fields 152 may be disposed in a straight line along the periphery of a region in which the first manifold through-hole 110 for reaction gas discharging is formed. Thus, the closed loop shape of the first inner bead seal 150 may be simplified by disposing the multiple first main connection bead flow fields 152 in a straight line, and thus a sealing material (not shown) may be smoothly applied on the surface of the first inner bead seal 150 when being applied thereto.

Positions in which the multiple first main connection bead flow fields 152 are formed may be changed, thereby preventing generated water from flowing to an undesired position.

For example, as illustrated in FIG. 5, according to another embodiment of the present disclosure, at least one selected first main connection bead flow field 152a among multiple first main connection bead flow fields 152 may be formed closer to the entrance of the first main discharge bead flow fields 151 than an unselected first main connection bead flow field 152b.

Specifically, among the multiple first main connection bead flow fields 152, the selected first main connection bead flow field 152a may be relatively connected to an entrance side of the first main discharge bead flow fields 151, and the unselected first main connection bead flow field 152b may be relatively connected to an exit side of the first main discharge bead flow fields 151.

Therefore, although generated water flowing in a first main discharge bead flow field 151 flows to a first main discharge bead flow field 151 formed thereunder through an unselected first main connection bead flow field 152b, the generated water may be discharged through the exit of the corresponding first main discharge bead flow field 151 without flowing to a first main connection bead flow field 152a which is formed in a relatively high position and selected.

Therefore, first main connection bead flow fields 152a, which are selected from among the multiple first main connection bead flow fields 152, and first main connection bead flow fields 152b, which are not selected, may be alternately arranged. At this time, the first main connection bead flow fields 152a, which are selected, and the first main connection bead flow fields 152b, which are not selected, are not limited to being alternated one by one, but multiple first main connection bead flow fields 152b, which are not selected, may be formed between first main connection bead flow fields 152a which are selected.

In order to smoothly discharge a reaction gas and generated water, the widths of the first main discharge bead flow fields 151 may be formed to be larger than the widths of the first main connection bead flow fields 152.

The second separator may be formed to be symmetrical to the first separator with reference to a surface facing the first separator.

For example, although not illustrated in the drawings, the second separator may be formed in a plate shape, and may have multiple second manifold through-holes which are formed in both sides thereof and along which a reaction gas or a coolant is introduced or discharged.

Furthermore, in the second separator, a second reaction surface, having a flow field along which a reaction gas or a coolant flows, may be formed between a second manifold through-hole formed at one side thereof and a second manifold through-hole formed at the other side thereof. Further, second diffusion parts may be formed between the second reaction surface and the second manifold through-hole formed at one side and between the second reaction surface and the second manifold through-hole formed at the other side, respectively, such that a reaction gas or a coolant can be diffused.

Furthermore, the second separator may have multiple second inner bead seals protruding for sealing and formed along the periphery of each region in which multiple second manifold through-holes are formed. In addition, a second outer bead seal protruding for sealing may be formed along the outer edge of the second separator so as to surround all of the second reaction surface, the second diffusion parts, and the multiple inner bead seals.

Particularly, a second inner bead seal formed at the periphery of a second manifold through-hole for reaction gas discharging may include multiple second main discharge bead flow fields formed at a second diffusion part so as to connect the second manifold through-hole for reaction gas discharging, multiple second main connection bead flow fields formed to make neighboring second main discharge bead flow fields communicate with each other, and a second edge bead formed along the periphery of the second manifold through-hole for reaction gas discharging in the remaining region other than a region in which the multiple second main discharge bead flow fields and the multiple second main connection bead flow fields are formed.

At this time, in the second separator, the second inner bead seal, which includes the second main discharge bead flow fields, the second main connection bead flow fields, and the second edge bead, and the second outer bead seal may protrude in a direction opposite to the direction in which, in the first separator 100, the first inner bead seal 150, which includes the first main discharge bead flow fields 151, the first main connection bead flow fields 152, and the first edge bead 153, and the first outer bead seal 140 protrude.

Therefore, the first inner bead seal 150 of the first separator 100 and the second inner bead seal of the second separator may be bonded to each other to form an inner airtight line, and the first outer bead seal 140 of the first separator 100 and the second outer bead seal of the second separator may be bonded to each other to form an outer airtight line.

Furthermore, multiple main discharge flow field lines may be formed by bonding the multiple first main discharge bead flow fields 151 to the multiple second main discharge bead flow fields, and multiple main connection flow field lines may be formed by bonding the multiple first main connection bead flow fields 152 to the multiple second main connection bead flow fields.

A rubber sealing material (not shown) may be applied on the surfaces of the first outer bead seal 140 and the first inner bead seal 150 of the first separator 100. Likewise, a rubber sealing material (not shown) may be applied on the surfaces of the second outer bead seal and the second inner bead seal of the second separator. Therefore, a rubber sealing material may be applied on the surfaces of the outer airtight line and the inner airtight line, and thus the airtightness of a fuel cell stack may be maintained by the outer airtight line and the inner airtight line when unit cells are stacked.

The present disclosure has been described with reference to the accompanying drawings and the above-mentioned exemplary embodiments. However, the present disclosure is not limited thereto, and may be limited by the accompanying claims. Therefore, those skilled in the art may variously change and modify the present disclosure without departing from the technical spirit of the accompanying claims.

What is claimed is:

1. A bead-type separator for a fuel cell, the bead-type separator having a plate shape and comprising:
 a reaction surface disposed at a center of the separator and configured to react a flowing reaction gas;

a diffusion part disposed at both sides of the reaction surface and configured to diffuse the reaction gas;

multiple manifold through-holes disposed in regions at both ends of the separator and configured to introduce or discharge the reaction gas; and multiple protruding inner bead seals along a periphery of the regions in which the manifold through-holes are disposed, wherein the inner bead seals comprise a first inner bead seal disposed at the periphery of the region in which the manifold through-hole configured to discharge the reaction gas is formed, and wherein the first inner bead seal comprises:

multiple main discharge bead flow fields protruding in tunnel shapes from the diffusion part so as to connect the manifold through-hole configured to discharge the reaction gas and disposed along the periphery of the manifold through-hole configured to discharge the reaction gas while being spaced apart from each other; and multiple main connection bead flow fields, each of which is disposed such that neighboring ones of the main discharge bead flow fields communicate with each other;

wherein the first inner bead seal further comprises an edge bead disposed along the periphery of the manifold through-hole configured to discharge the reaction gas in a remaining region other than a region in which the multiple main discharge bead flow fields and the multiple main connection bead flow fields are disposed; and wherein the first inner bead seal comprises a closed loop surrounding the periphery of the manifold through-hole configured to discharge the reaction gas by the multiple main discharge bead flow fields, the multiple main connection bead flow fields, and the edge bead.

2. The bead-type separator of claim 1, wherein:

an entrance of each of the main discharge bead flow fields is connected to the diffusion part and an exit of each of the main discharge bead flow fields is connected to the manifold through-hole configured to discharge the reaction gas; and each of the main discharge bead flow fields slopes downward from the entrance toward the exit with reference to a gravity direction.

3. The bead-type separator of claim 2, wherein the entrance of a first main discharge bead flow field, disposed in a lowest position in the gravity direction, among the multiple main discharge bead flow fields is disposed in a lower position than an exit of a first diffusion flow field, disposed in a lowest position in the gravity direction, among multiple diffusion flow fields formed at the diffusion part and configured to allow the reaction gas to flow therethrough.

4. The bead-type separator of claim 1, wherein the edge bead comprises:

a sub connection bead flow field connected to a first main discharge bead flow field, disposed in the lowest position in a gravity direction, among the multiple main discharge bead flow fields; and a sub discharge bead flow field connected to the manifold through-hole configured to discharge the reaction gas.

5. The bead-type separator of claim 4, wherein a position in which the sub connection bead flow field is connected to the first main discharge bead flow field is closer to an entrance than a position in which a second main connection bead flow field is connected.

6. The bead-type separator of claim 1, wherein the multiple main connection bead flow fields are disposed in a straight line along the periphery of the region in which the manifold through-hole configured to discharge the reaction gas is formed.

7. The bead-type separator of claim 6, wherein a selected main connection bead flow field among the multiple main connection bead flow fields is disposed closer to an entrance of a main discharge bead flow field than an unselected main connection bead flow field.

8. The bead-type separator of claim 7, wherein the selected main connection bead flow field and the unselected main connection bead flow field are alternately disposed.

9. The bead-type separator of claim 1, wherein widths of the main discharge bead flow fields are larger than widths of the main connection bead flow fields.

10. The bead-type separator of claim 1, further comprising a protruding outer bead seal disposed along an outer edge of the separator and surrounding the reaction surface, the diffusion part, and the multiple inner bead seals.

11. The bead-type separator of claim 1, further comprising a second separator having a plate shape, the second separator comprising:

second main discharge bead flow fields disposed in positions corresponding to positions of the main discharge bead flow fields and protruding in a direction opposite to a direction in which the main discharge bead flow fields protrude; and second main connection bead flow fields disposed in positions corresponding to positions of the main connection bead flow fields and protruding in a direction opposite to a direction in which the main connection bead flow fields protrude; and wherein the separator and the second separator are bonded to each other so as to define multiple main discharge flow field lines comprising the multiple main discharge bead flow fields and the second main discharge bead flow fields and to define multiple main connection flow field lines comprising the multiple main connection bead flow fields and the second main connection bead flow fields.

12. The bead-type separator assembly of claim 11, wherein the second separator comprises:

a second reaction surface disposed a center of the second separator and configured to react the flowing reaction gas;

a second diffusion part disposed at both sides of the second reaction surface and configured to diffuse the reaction gas;

multiple second manifold through-holes disposed at both ends of the second separator and configured to introduce or discharge the reaction gas; and multiple second inner bead seals that protrude for sealing and are disposed along a periphery of each region in which the second manifold through-holes are formed, wherein one of the second inner bead seals among the multiple second inner bead seals disposed at the periphery of the region where the second manifold through-hole configured to discharge the reaction gas is disposed comprises the second main discharge bead flow fields and the second main connection bead flow fields.

13. The bead-type separator assembly of claim 12, wherein:

the one of the inner bead seals further comprises an edge bead disposed along the periphery of the manifold through-hole configured to discharge the reaction gas in a remaining region other than a region in which the multiple main discharge bead flow fields and the multiple main connection bead flow fields are disposed;

the second separator further comprises a second edge bead disposed in a position corresponding to a position in which the edge bead is disposed and protruding in a direction opposite to a direction in which the edge bead protrudes;

the separator and the second separator are bonded to each other and define an inner airtight line comprising the inner bead seals and the second inner bead seals; and the inner airtight line defines a closed loop.

14. The bead-type separator assembly of claim 12, wherein:
an entrance of the main discharge flow field line is connected to a region in which the diffusion part faces the second diffusion part;
an exit of the main discharge flow field line is connected to a region in which the manifold through-hole configured to discharge the reaction gas communicates with the second manifold through-hole configured to discharge the reaction gas; and
the main discharge flow field line is formed to slope downward from the entrance toward the exit with reference to a gravity direction.

15. The bead-type separator assembly of claim 11, wherein:
the separator further comprises an outer bead seal protruding for sealing and disposed along an outer edge of the separator so as to surround the reaction surface, the diffusion part, and the multiple inner bead seals;
the second separator comprises a second outer bead seal disposed in a position corresponding to a position in which the outer bead seal is disposed and protruding in a direction opposite to a direction in which the outer bead seal protrudes;
the separator and the second separator are bonded to each other so as to define an outer airtight line comprising the outer bead seal and the second outer bead seal; and
the outer airtight line defines a closed loop.

16. The bead-type separator assembly of claim 15, further comprising a sealing material applied on a surface of the outer airtight line.

17. A bead-type separator for a fuel cell, the bead-type separator having a plate shape and comprising:
a reaction surface disposed at a center of the separator and configured to react a flowing reaction gas;
a diffusion part disposed at both sides of the reaction surface and configured to diffuse the reaction gas;
multiple manifold through-holes disposed in regions at both ends of the separator and configured to introduce or discharge the reaction gas; and
multiple protruding inner bead seals along a periphery of the regions in which the manifold through-holes are disposed, wherein the inner bead seals comprise a first inner bead seal disposed at the periphery of the region in which the manifold through-hole configured to discharge the reaction gas is formed, and wherein the first inner bead seal comprises:
multiple main discharge bead flow fields protruding in tunnel shapes from the diffusion part so as to connect the manifold through-hole configured to discharge the reaction gas and disposed along the periphery of the manifold through-hole configured to discharge the reaction gas while being spaced apart from each other; and
multiple main connection bead flow fields, each of which is disposed such that neighboring ones of the main discharge bead flow fields communicate with each other;
wherein an entrance of each of the main discharge bead flow fields is connected to the diffusion part and an exit of each of the main discharge bead flow fields is connected to the manifold through-hole configured to discharge the reaction gas; and
each of the main discharge bead flow fields slopes downward from the entrance toward the exit with reference to a gravity direction.

18. The bead-type separator of claim 17, wherein the entrance of a first main discharge bead flow field, disposed in a lowest position in the gravity direction, among the multiple main discharge bead flow fields is disposed in a lower position than an exit of a first diffusion flow field, disposed in a lowest position in the gravity direction, among multiple diffusion flow fields formed at the diffusion part and configured to allow the reaction gas to flow therethrough.

19. The bead-type separator of claim 17, wherein the multiple main connection bead flow fields are disposed in a straight line along the periphery of the region in which the manifold through-hole configured to discharge the reaction gas is formed.

20. The bead-type separator of claim 17, wherein widths of the main discharge bead flow fields are larger than widths of the main connection bead flow fields.

* * * * *

UNITED STATES PATENT AND TRADEMARK OFFICE
CERTIFICATE OF CORRECTION

| | | |
|---|---|---|
| PATENT NO. | : 12,494,495 B2 | Page 1 of 1 |
| APPLICATION NO. | : 17/874125 | |
| DATED | : December 9, 2025 | |
| INVENTOR(S) | : Jae Hyeon Choi | |

It is certified that error appears in the above-identified patent and that said Letters Patent is hereby corrected as shown below:

In the Claims

In Column 12, in Claim 1, Line 67, delete "react a" and insert -- react with a --.

Signed and Sealed this
Twentieth Day of January, 2026

John A. Squires
*Director of the United States Patent and Trademark Office*